United States Patent [19]
Katto

[11] Patent Number: 5,657,085
[45] Date of Patent: Aug. 12, 1997

[54] WAVELET TRANSFORM CODING METHOD

[75] Inventor: Jiro Katto, Tokyo, Japan

[73] Assignee: NEC Corporation, Tokyo, Japan

[21] Appl. No.: 601,469

[22] Filed: Feb. 14, 1996

Related U.S. Application Data

[63] Continuation of Ser. No. 199,026, Feb. 18, 1994, abandoned.

[30] Foreign Application Priority Data

Feb. 18, 1993 [JP] Japan .................... 5-028337

[51] Int. Cl.$^6$ .................................................. H04N 7/30
[52] U.S. Cl. ........................................ 348/398; 348/403
[58] Field of Search ............................ 348/384, 390, 348/403–405, 397, 398, 420; 382/232, 236, 248–250; H04N 7/130

[56] References Cited

U.S. PATENT DOCUMENTS

| | | | |
|---|---|---|---|
| 5,014,134 | 5/1991 | Lawton et al. | 358/426 |
| 5,107,345 | 4/1992 | Lee | 348/403 |
| 5,315,670 | 5/1994 | Shapiro | 358/426 |
| 5,321,776 | 6/1994 | Shapiro | 348/384 |
| 5,396,237 | 3/1995 | Ohta . | |

*Primary Examiner*—Tommy P. Chin
*Assistant Examiner*—Richard Lee
*Attorney, Agent, or Firm*—Sughrue, Mion, Zinn, Macpeak & Seas

[57] ABSTRACT

An improved coding performance for wavelet transform coding. The method comprises: two-dimensional wavelet transforming an input picture signal to output transform coefficients; two-dimensionally arranging the transform coefficients; quantizing the arranged transform coefficients; choosing a scanning pattern for the quantized transform coefficients based on the correlation between these coefficients; generating a one-dimensional signal series by scanning the transform coefficients after they are quantized according to a scanning pattern decided in the above step; coding the one-dimensional signal series; and, finally, terminating the coding of the signal series using a symbol indicating the end of scanning.

14 Claims, 11 Drawing Sheets

FIG.1A
SPATIAL AREA
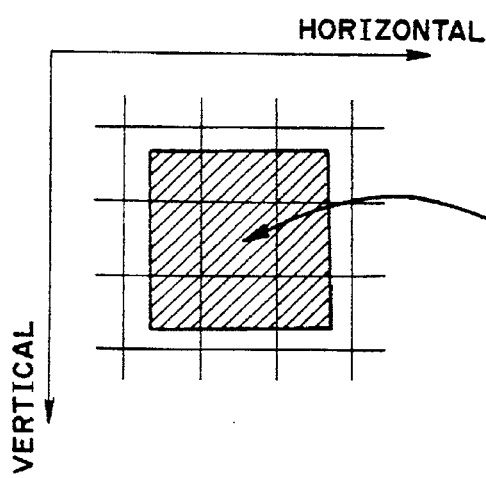
FIG.1B
TRANSFORM AREA
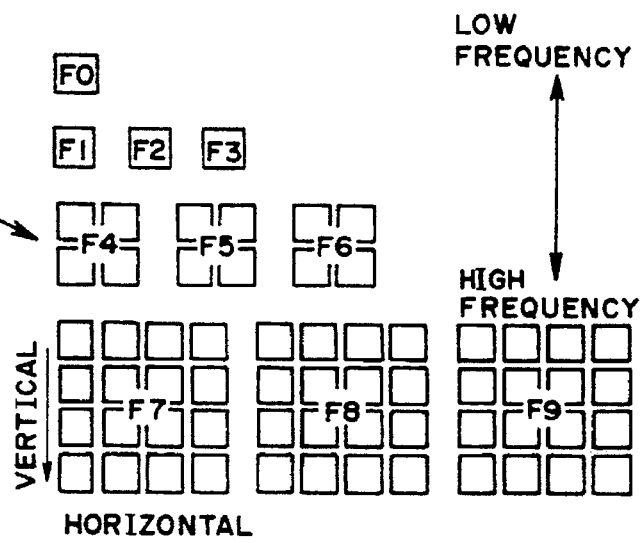
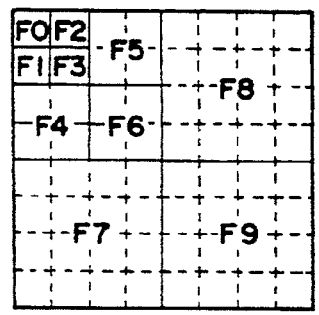
FIG.1C

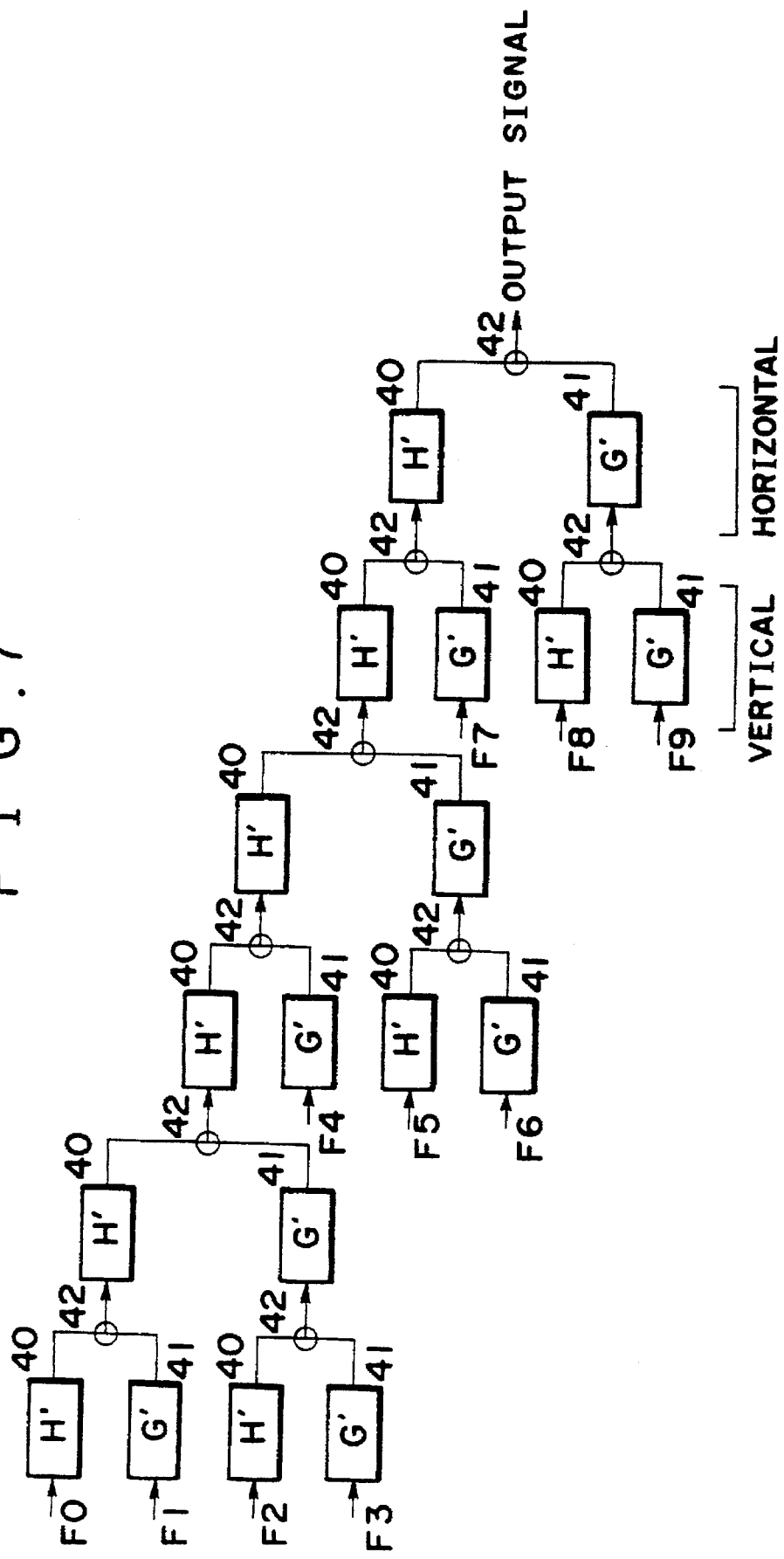

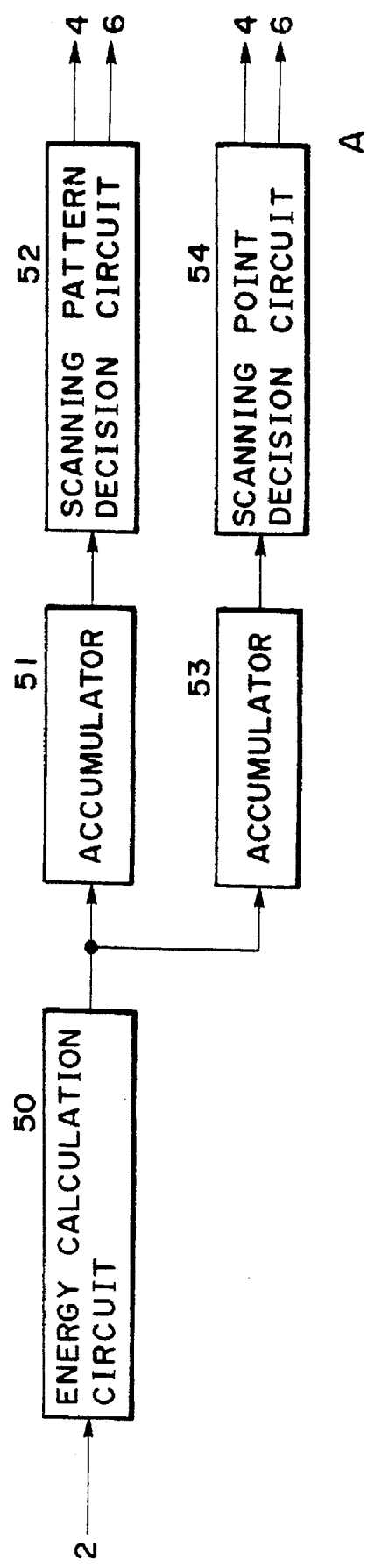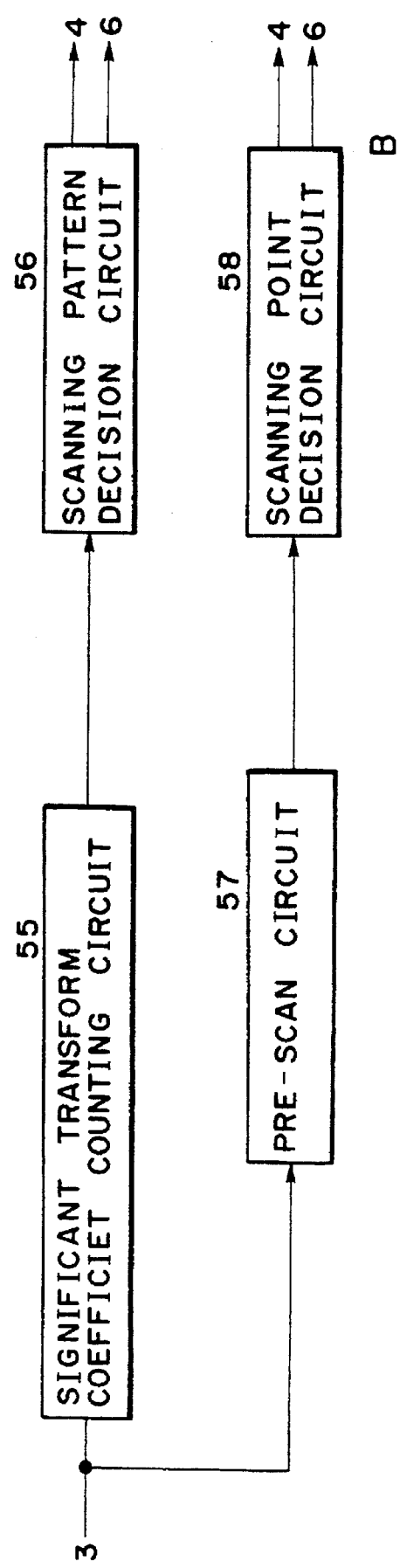

WAVELET TRANSFORM CODING METHOD

This is a continuation of application Ser. No. 08/199,026 filed Feb. 18, 1994 now abandoned.

BACKGROUND OF THE INVENTION

The present invention relates to a wavelet transform coding method.

As methods for coding a picture signal with efficiency using an orthonormal transform coding method, subband coding method and wavelet transform coding method are known.

The orthonormal transform coding method realizes an efficient coding by way of the steps of practicing orthonormal transform to an input signal, concentrating power to a specific transform coefficient and utilizing the power bias.

Also, the subband coding method realizes an efficient coding by way of the steps of dividing an input signal into a plurality of frequency bands and utilizing power bias to low frequency band.

The wavelet transform coding method realizes an efficient coding by way of the steps of practicing a o subband class-dividing by recursively dividing a band in low frequency into two, and utilizing concentration of power in low band component.

In these methods, a picture signal is expressed by frequency band and then coded. The signal expressed by frequency bands can be coded with high-efficiency by various methods.

For example, in the orthonormal transform coding method, a method of combination of EOB (End of Block) symbol and a scanning means to transform a two-dimensional transform coefficient to a one-dimensional signal series is known. FIG. 10 illustrates an example of scanning method used for the orthonormal transform. In this method, a coder scans in zigzag two-dimensionally arranged transform coefficients from a low frequency component to a high frequency component, transforms them in a one-dimensional signal series. Then it codes this one-dimensional signal series in order, and generates a symbol called EOB to complete coding in a block when coding of all significant transform coefficients in an arrangement has been completed.

The kind of scanning method in the above examples is only one, however, a method adaptively changing scanning method using difference of local character of a picture signal is also known. For example, this method functions as below. In a picture having many vertical stripes, the low frequency components in vertical direction of power concentrates in horizontal direction as shown in FIG. 11A. On the other hand, in a picture having many horizontal stripes, the low frequency components in horizontal direction of power concentrates in vertical direction as shown in FIG. 11B. Then, corresponding to local character of a picture signal, an efficient coding is realized by selecting and utilizing a scanning pattern as shown in FIG. 11C for a picture having many vertical stripes or a scanning pattern as shown in FIG. 11D for a picture having many horizontal stripes.

For the subband coding method or the wavelet coding method, a method indicated in the Japanese Patent Application No. 3-31502 (1991) is known. In this application, a tree structure expressing the same spatial area is defined and a scanning method scanning from low frequency components to high frequency components in this tree structure is indicated. In FIG. 12, the bands F0 to F9 enclosed by a solid line express an example of frequency dividing in a wavelet transform. Here, the ratio between the sizes of frequency bands corresponds to the ratio of numbers of transform coefficients in the frequency bands. The number of transform coefficients necessary to express the same spatial area is four for F4 to F6, 16 for F7 to F9 when one for F0 to F3. In this example, a frequency band is divided into 10 totally, F0 to F9.

After dividing frequency band in the above manner, a coder starts scanning from transform coefficients belonging to low frequency components to transform coefficients belonging to high frequency components, and codes them as a one-dimensional signal sequence. When coding of all significant transform coefficients in an arrangement has been completed, a signal called EOT (End of Tree) is generated and coding of a tree structure is completed.

In FIG. 12, the number of transform coefficients given by a tree structure expressing the same spatial area is plural in the frequency bands F4 to F9. However, the scanning method indicated in the JP-A-4-245863 (1992) to scan a plurality of transform coefficients included in the same frequency band does not generate continuous zero level signals. In addition, there is or one kind of scanning method; switching adaptively switching over the scanning way corresponding to the picture pattern is not mentioned. Therefore, this method has the disadvantage of coding non-significant transform coefficients that are not necessary to be coded, thus causing deterioration of coding efficiency.

SUMMARY OF THE INVENTION

The object of the present invention is to offer a wavelet transform coding method improving the scanning method for transform coefficients at wavelet transform coding and having high entropy coding efficiency.

The above object is achieved by a wavelet transform coding method comprising: a step of applying a two-dimensional wavelet transform to an input picture signal, taking transform coefficients expressing the same spatial area out of the resulting output of the above transformation and two-dimensionally arranging said transform coefficients; a step of quantizing said arranged transform coefficients; a step of deciding a scanning pattern for said quantized transform coefficients based on correlation between said transform coefficients; a step of generating a one-dimensional signal series by scanning said transform coefficients that have been quantized according to a scanning pattern decided in the said above step and coding said one-dimensional signal series; and a step of terminating said coding of a signal series using a symbol indicating end of scanning when zero continues from a pre-determined transform coefficient to be scanned to a transform coefficient to be lastly scanned.

The step of deciding a scanning pattern is a step of deciding a scanning pattern for each frequency band in accordance with correlation between said transform coefficients in a frequency band.

It is desirable that said step of deciding a scanning pattern for each frequency band in accordance with a correlation between said transform coefficients in a frequency band is comprised so as to decide a scanning pattern as follows: (a) horizontally scanning for the transform coefficients in a frequency band of which horizontal portions belong to low-frequency bands and vertical portions belong to high-frequency bands; and (b) vertically scanning for the transform coefficients in a frequency bands of which horizontal portions belong to high-frequency bands and vertical portions belong to low-frequency bands.

The step of deciding a scanning pattern for each frequency band in accordance with a correlation between said transform coefficients in a frequency band is comprised so as to adaptively decide, when scanning said quantized transform coefficients in said each frequency band, a scanning start point in each frequency band in accordance with the locality of said input picture signal.

The step of adaptively deciding a scanning start point in each frequency band in accordance with the locality of said input picture signal is comprised so as to scan said transform coefficient in said pre-determined frequency band and decide, based on this scanning result, a scanning start point in the other frequency bands.

The step of adaptively deciding a scanning start point in said each frequency band in accordance with locality of said input signal is comprised so as to decide, based on energy distribution of said transform coefficients that are not quantized yet in each frequency band, a scanning start point in each frequency band.

The step of deciding, based on the energy distribution of said transform coefficients that are not quantized yet, a scanning start point in each frequency band comprises: a step of calculating squared values of said transform coefficients on each scanning line in each frequency band; a step of calculating the sum of said squared values of transform coefficients on each scanning line; and a step of detecting the largest sum from among said sums and deciding a scanning start point so as to start scanning from a scanning line corresponding to this largest sum.

The step of deciding, based on the energy distribution of said transform coefficients being before quantized yet, a scanning start point in each frequency band comprises: a step of calculating absolute values of said transform coefficients on each scanning line in each frequency band; a step of calculating the sum of said absolute values of transform coefficients on said each scanning line; and a step of detecting the largest sum from among said sums and deciding a scanning start point so as to start scanning from a scanning line corresponding to this largest sum.

The step of adaptively deciding a scanning start point in said each frequency band in accordance with the locality of said input picture signal is comprised so as to decide, based on a transform coefficient distribution of said transform coefficients after being quantized in each frequency band, a scanning start point in each frequency band.

The step of deciding, based on transform coefficient distribution of said transform coefficients after being quantized, a scanning start point in each frequency band comprises: a step of calculating the number of significant transform coefficients on each scanning line in each frequency band; and a step of detecting the largest number from among said numbers of significant transform coefficients and deciding a scanning start point so as to start scanning from a scanning line corresponding to this largest number.

The step of deciding a scanning pattern is a step of adaptively deciding a sequence of scanning each frequency band in accordance with locality of said the input signal.

The said step of deciding a sequence of scanning each frequency band is comprised of deciding, based on energy distribution of said transform coefficients before being quantized in each frequency band, a sequence of scanning each frequency band.

The step of deciding, based on energy distribution of said transform coefficients before quantized, a sequence of scanning each frequency band comprises: a step of calculating squared values of said transform coefficients in each frequency band; a step of calculating, from said squared values of said transform coefficients, an average value of squared values of said transform coefficients in each frequency band; and a step of deciding a scanning pattern so as to scan each frequency band in the order of said average values from the largest to the smallest.

The step of deciding, based on energy distribution of said transform coefficients being before quantized, a sequence of scanning each frequency band comprises: a step of calculating absolute values of said transform coefficients in each frequency band; a step of calculating, from said absolute values of transform coefficients, an average value of said absolute values of transform coefficients in each frequency band; and a step of deciding a scanning pattern so as to scan each frequency band in order of said average values from the largest to the smallest.

The step of deciding a sequence of scanning for each frequency band is comprised so as to decide, based on significant transform coefficient distribution of said transform coefficients after quantized, a sequence of scanning each frequency band.

The step of deciding, based on significant transform coefficient distribution of said transform coefficients after quantized, a sequence of scanning each frequency band comprises: a step of calculating number of transform coefficients in each frequency band; a step of calculating number of significant transform coefficients in each frequency band; a step of calculating (said number of significant transform coefficients in each frequency band)/(said number of transform coefficients in each frequency band); and a step of deciding a scanning pattern so as to scan each frequency band in order of said ratios from the largest to the smallest.

Described as above, by the present invention, level zero signals continue because the scanning pattern is decided based on correlation between transform coefficients. As the result, it can be possible to efficiently utilize the symbol indicating end of scanning, improve coding performance and offer a wavelet transform coding method having good efficiency of entropy coding.

BRIEF DESCRIPTION OF THE DRAWINGS

FIG. 1A, FIG. 1B and FIG. 1C illustrate relations between a spatial area and transform areas.

FIG. 7 shows a block diagram of a two-dimensional wavelet inverse-transformer circuit.

FIG. 9A and FIG. 9B show block diagrams of adaptive control circuits.

DETAILED DESCRIPTION OF THE INVENTION

The embodiments of the present invention are explained referring figures.

At first, a step of deciding a scanning pattern of the present invention is described.

FIG. 1A to FIG. 1C illustrate relations between spatial area and transform area.

In FIG. 1A, let a square block be 8×8 size. Then, wavelet transform coefficients of the oblique-lined spatial area including in its center the square block is given as a set of 64 transform coefficients as shown in FIG. 1B. Here, F0 to F9 in FIG. 1A to FIG. 1C correspond to frequency bands shown in FIG. 12.

Next, the transform coefficients shown in FIG. 1B are arranged as shown in FIG. 1C and a block of transform coefficients is configured. Where, each small square corresponds to each one transform coefficient, each transform coefficient in the area enclosed by solid line belongs to the same frequency band, differing to the case of orthonormal transform. Also, the transform coefficients belonging to the same frequency band are described according to their spatial portions.

Then, the case of dividing whole of a picture into these transform coefficient blocks, quantizing, scanning and coding them is considered.

In the wavelet transform coefficients arranged as above, the transform coefficients (F4 and F7, for example) in the frequency band belonging to a low frequency band in the horizontal direction and high frequency band in vertical direction tend to continuously generate significant transform coefficients in the horizontal direction. On the other hand, the transform coefficients (F5 and F8, for example) in the frequency band belonging to the high frequency band in horizontal direction and the low frequency band in vertical direction tend to continuously generate significant transform coefficients in vertical direction.

Figure 2A:
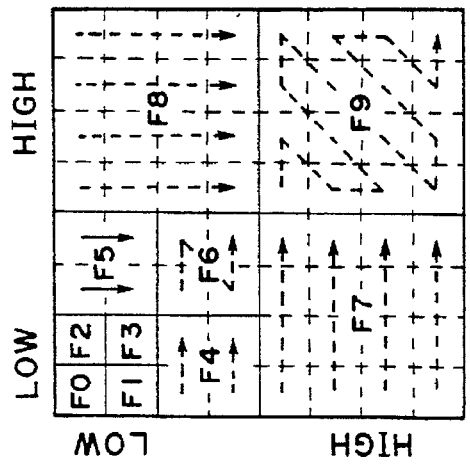
FIG. 2A, FIG. 2B, FIG. 2C, FIG. 2D and FIG. 2E illustrate scanning patterns.

Taking the above characteristics into consideration, as shown in FIG. 2A, a scanning pattern is decided so as to horizontally scan the transform coefficients (F4 and F7, for example) in the frequency band belonging to the low frequency band in the horizontal direction and the high frequency band in the vertical direction, and vertically scan the transform coefficients (F5 and F8, for example) in the frequency band belonging to the high frequency band in the horizontal direction and low frequency band in vertical direction. This scanning pattern causes, level 0 signals to continuously generate.

By introducing adaptive processing in accordance with picture locality, any needless processing like coding of un-significant transform coefficients, is omitted. As a result, the performance of coding is improved.

Figure 2B:
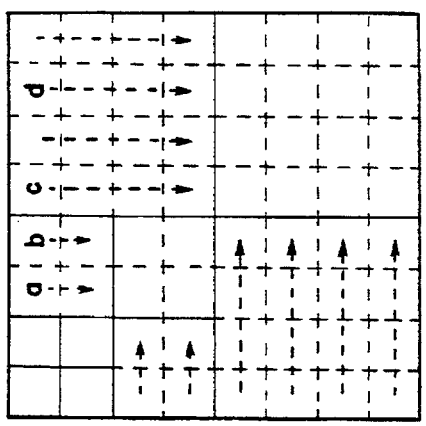

FIG. 2B illustrates how to adapt the scanning method in the same frequency band.

Figure 12:
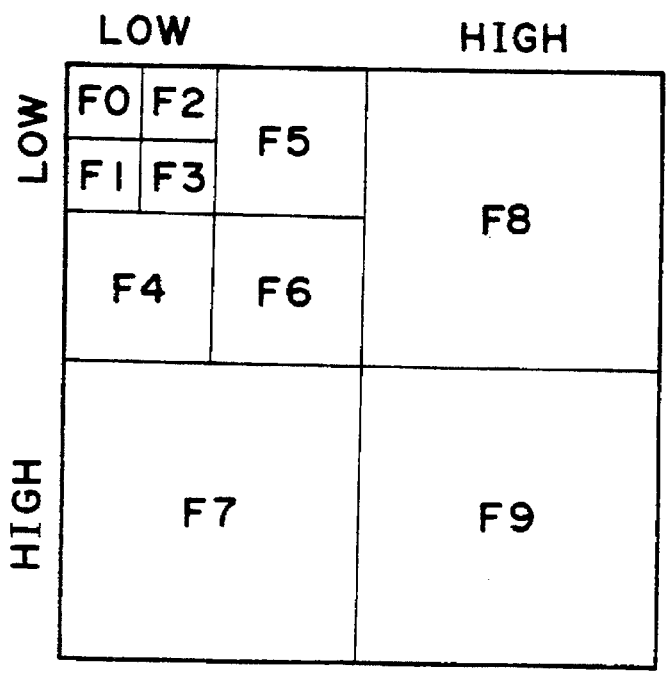
FIG. 12 illustrates wavelet transform frequency dividing.
Figure 11A:
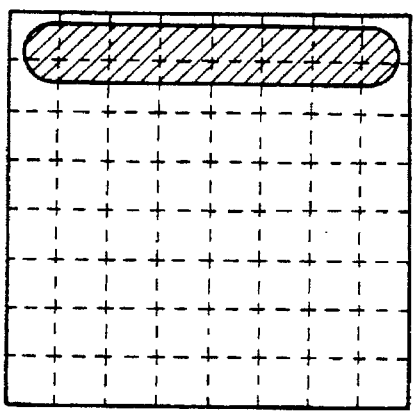
FIG. 11A, FIG. 11B, FIG. 11C and FIG. 11D illustrate orthonormal transform scanning methods.
Figure 11B:
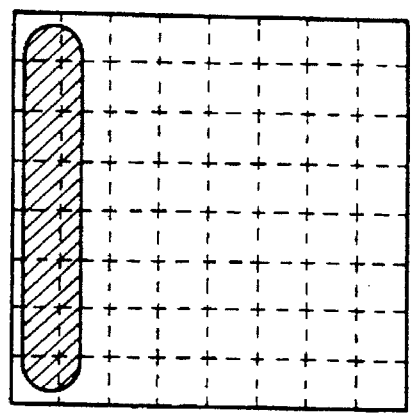
Figure 11C:
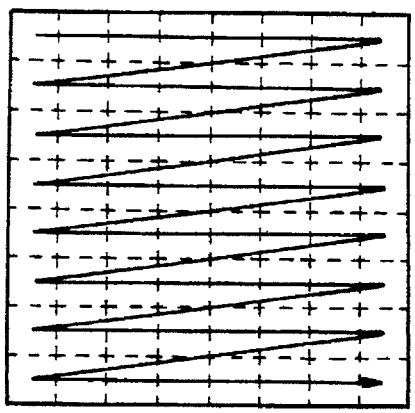
Figure 11D:
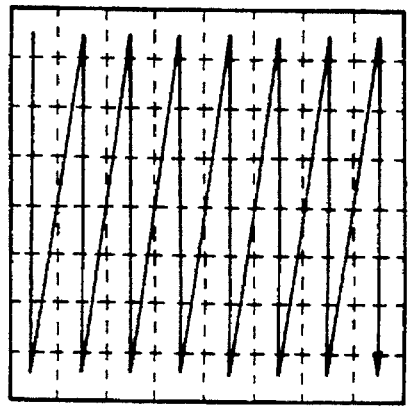

At an edge, etc. of a picture pattern, for example, significant transform coefficients are generated in the high frequency band. In addition, these significant transform coefficients may be generated frequently, if the same areas cross over different frequency bands. Referring to FIG. 12, significant transform coefficients are generated in the same areas of coefficients F1, F4 and F7. This holds true for F2, F5 and F8, and F3, F6 and F9. Then, taking this correlation between frequency bands into consideration, an adaptive scanning method is introduced.

In FIG. 2B, a, b, c and d indicate spatial scanning start points. According to the results of scans from a and b, it is decided whether scanning should be started from c or d. If the scanning result from a is zero run and that from b includes significant transform coefficients in the frequency band F5, it can be decided that significant transform coefficients are apt to be generated in the right side of the space. With this decision, in the frequency band F8, scanning is started from d, continuously done from c.

In the above method, firstly transform coefficients in a pre-determined frequency band are scanned, secondly scanning start points in other frequency bands are decided based on the scanning result. On the other hand, however, it is possible to decide scanning start points based on an energy distribution of transform coefficients before quantized or a significant transform coefficient distribution of transform coefficient after quantized in each frequency band.

With these methods, it becomes possible to detect a significant coefficient at the beginning stage of scanning in each frequency band.

Figure 2C:
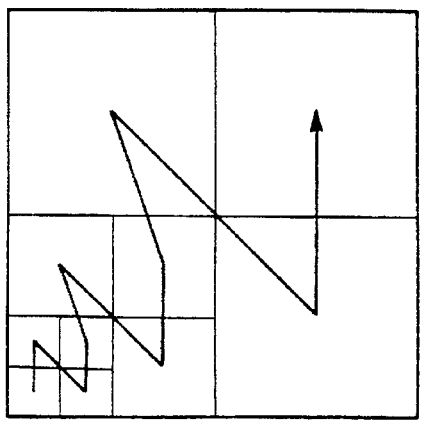
Figure 2D:
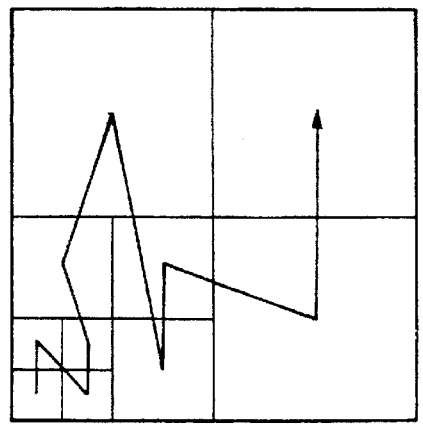
Figure 2E:
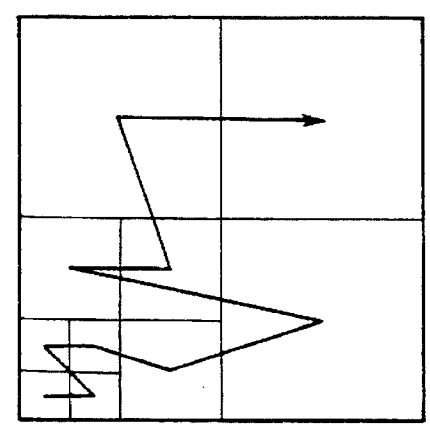

Next, in FIG. 2C, FIG. 2D and FIG. 2E, how to adapt scanning sequence to each frequency band is shown. This is a selection to adaptively exchange scanning sequence for scanning each frequency band corresponding to the local feature of a picture such as a pattern having many vertical stripes or a pattern having many horizontal stripes.

To put it concretely, FIG. 2C illustrates a basic scanning pattern, and a pattern shown in FIG. 2D is adaptively selected for a spatial area including many vertical edges, and a pattern shown in FIG. 2E is adaptively selected for a spatial area including many horizontal edges.

This selection is practiced based on an energy distribution of transform coefficients before quantized or a significant transform coefficient distribution of transform coefficient after quantized in each frequency band.

This way is based on the same principle of the orthonormal transform adaptive scanning shown in FIG. 9; it enables completion of detection of significant transform coefficients at an early stage of scanning and improved characteristics of entropy coding by introduction of a symbol indicating end of scanning.

Next, concrete embodiments of the present invention are explained.

Figure 3:
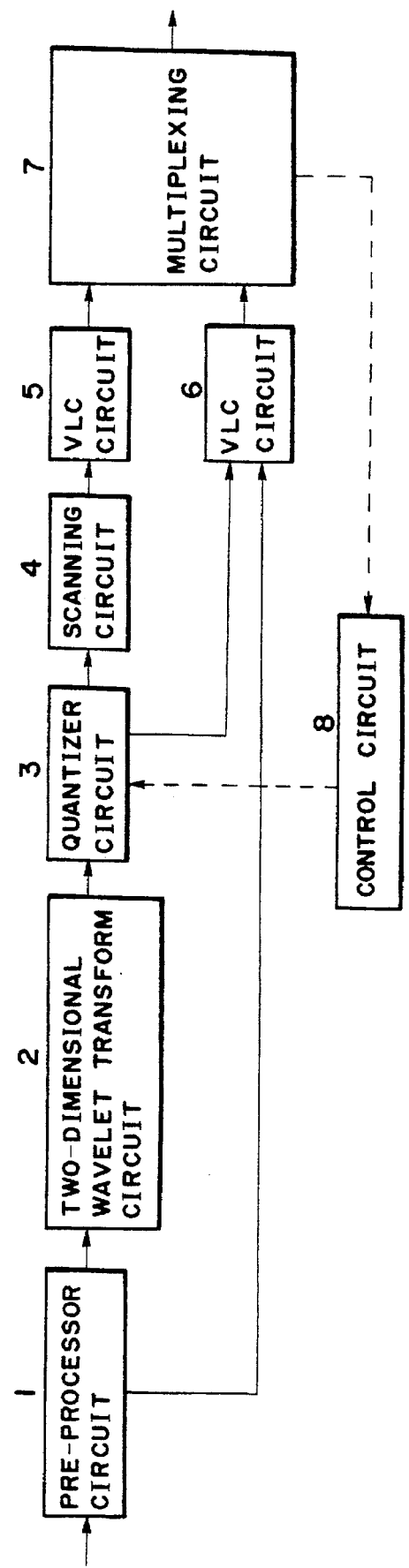
FIG. 3 shows a block diagram of a coder.

FIG. 3 illustrates a block diagram of a coder.

Figure 4:
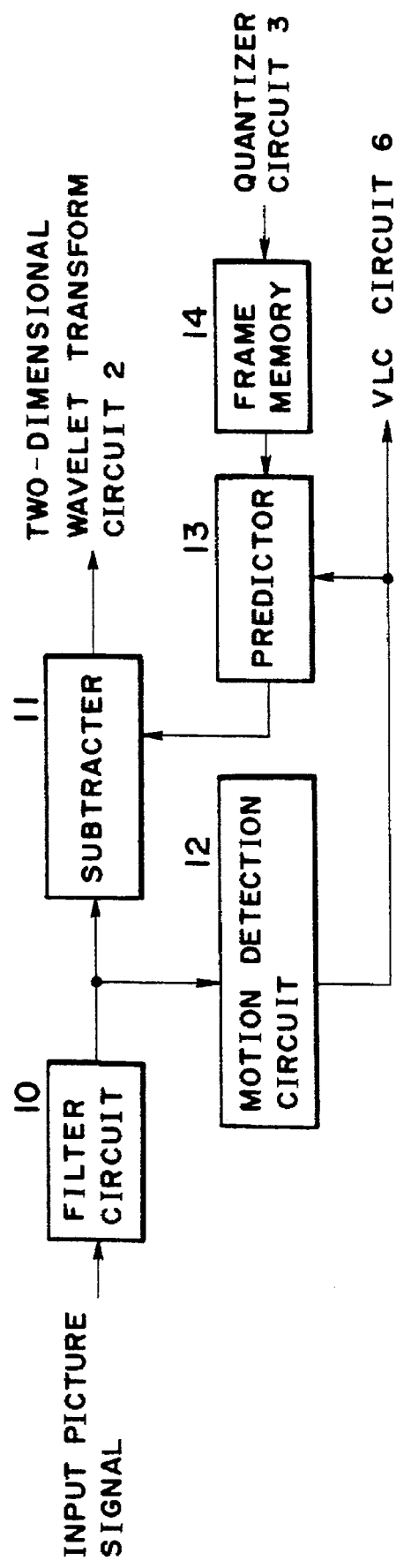
FIG. 4 shows a block diagram of a pre-processor circuit.

In this figure, a pre-processor circuit 1 realizes signal processing such as an adaptive prediction for motion compensation to an input picture or prefiltering. FIG. 4 shows an embodiment of the pre-processor circuit 1.

A main purpose of the filter circuit 10 is to remove noises of an input picture signal, the circuit works to an input signal as a low pass filter in space direction and time direction. A subtracter 11 calculates a difference between an input picture signal and a prediction picture signal that is an output of a predictor 13. A motion detection circuit 12 calculates a motion vector that minimizes energy of a differential signal between a coded picture signal of last frame and an input picture signal. The predictor 13 outputs a current frame prediction picture signal, based on a last frame coded picture signal given by a frame memory 14 and a motion vector information given by the motion detection circuit 12. The frame memory 14 accumulates a coded picture signal of last frame.

Figure 5:
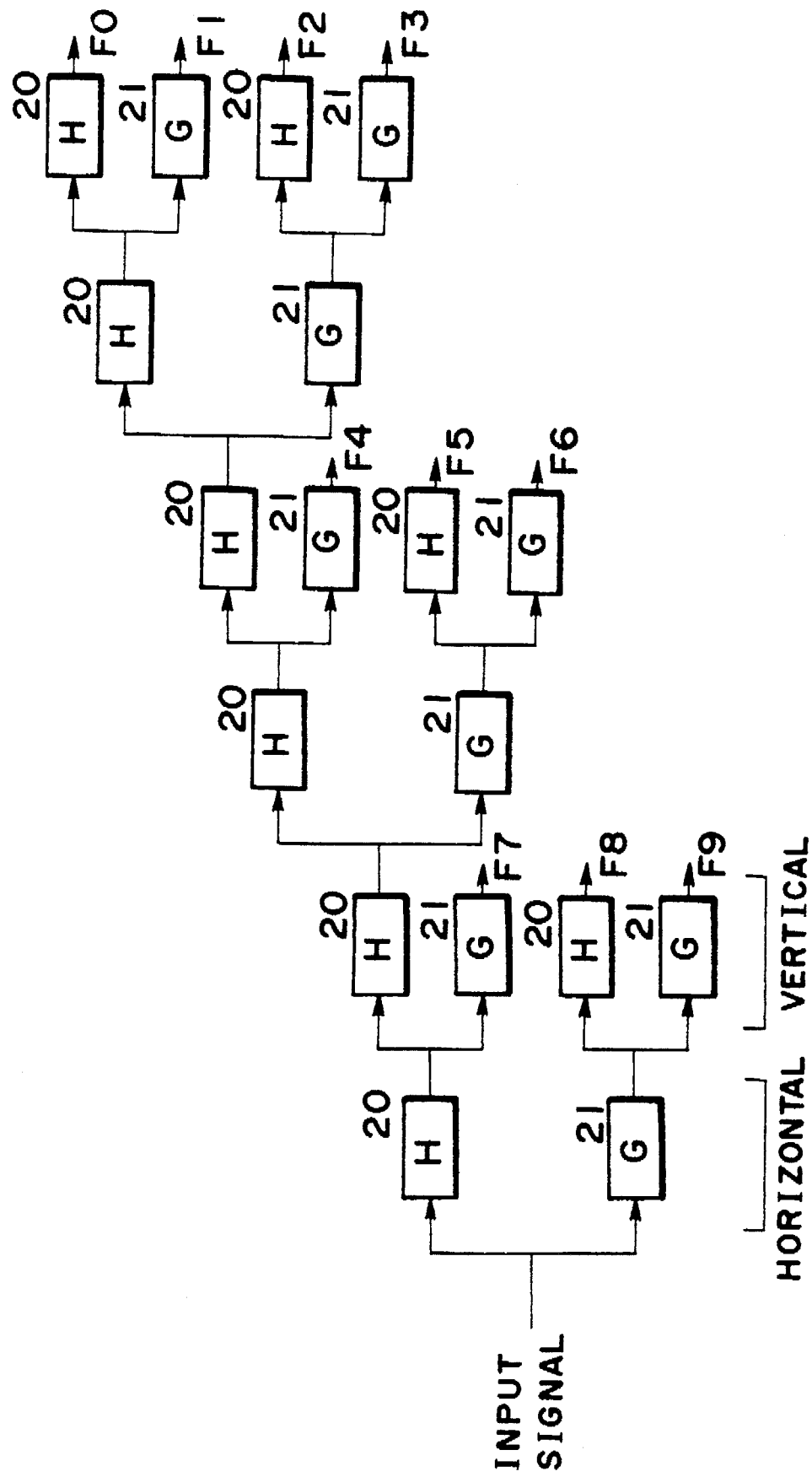
FIG. 5 shows a block diagram of a two-dimensional wavelet transformer circuit.

A two-dimensional wavelet transform circuit 2 realizes a wavelet transform to an output of the pre-processor circuit 1. FIG. 5 shows an embodiment of the two-dimensional wavelet transform circuit.

A filter circuit 20(H) and a filter circuit 21(G) filter an input signal and sample it in 2:1. Where, the frequency characteristics of the filter circuit 20 is low pass characteristics and the frequency characteristics of the filter circuit 21 is high pass characteristics. The two-dimensional wavelet transform is realized by multiplely connecting filter circuits horizontally and vertically as shown in FIG. 5. It is to be noted that F0 to F9 respectively corresponds to frequency areas shown in FIG. 12.

Figure 6:
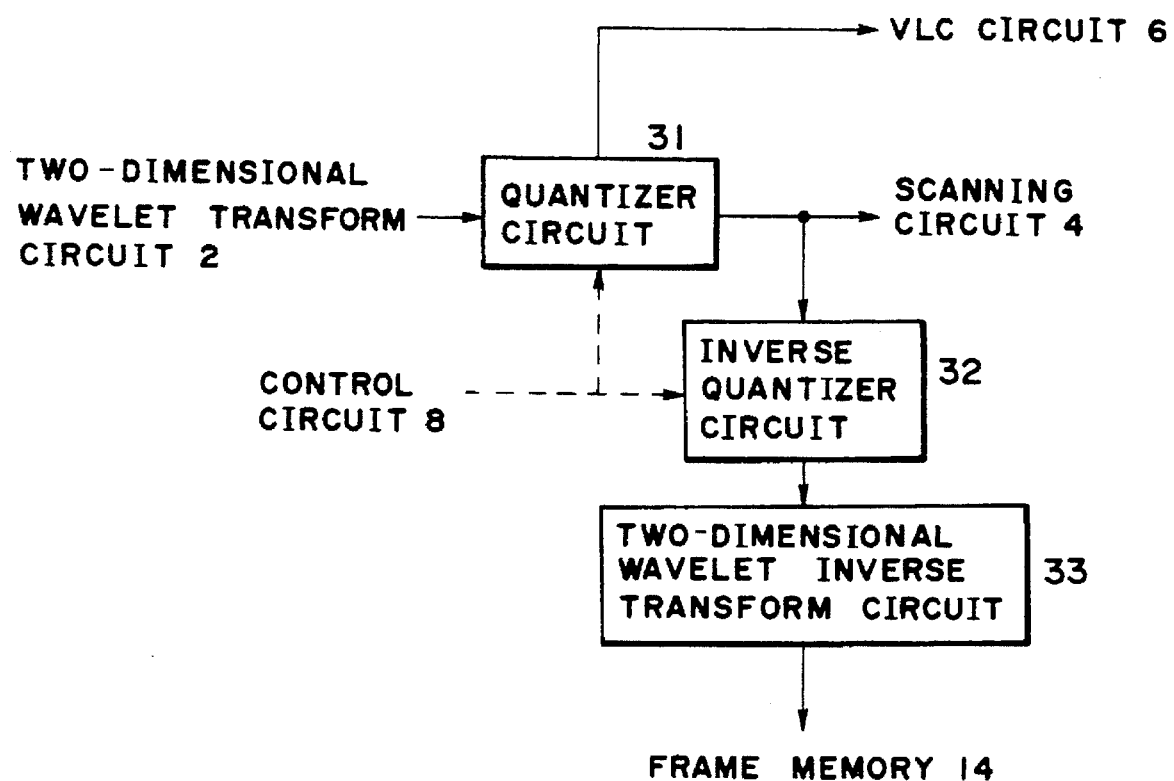
FIG. 6 shows a block diagram of a quantizer circuit.

A quantizer circuit 3 quantizes an output of the two-dimensional wavelet transform circuit 2. FIG. 6 illustrates an embodiment of the quantizer circuit in details.

A quantizer circuit 31 quantizes a wavelet transform coefficients, transmits a quantized step size to a VLC circuit 6. The quantizer circuit 31 firstly takes out a wavelet transform coefficient expressing the areas according to FIG. 1A and FIG. 1B, quantizing the two-dimensionally arranged wavelet transform coefficients as shown in FIG. 1C. An inverse quantizer circuit 32 inverse-quantizes a quantized output. In addition, the quantizer circuit 31 and the inverse quantizer circuit 32 provide a function to receive a control signal from a control circuit 8 corresponding to a state of the transmission buffer of a multiplexing circuit 7, and adaptively exchange a quantizing step size. A two-dimensional wavelet inverse transform circuit 33 performs inverse wavelet transforming of an output of the inverse quantizer circuit 32. FIG. 7 illustrates its embodiment. A filter circuit 40(H') and a filter circuit 41(G') practice 1:2 zero value interpolation and filtering. An adder 42 calculates the sum of outputs therefrom.

A scanning circuit 4 scans, corresponding to a decided scanning pattern, quantized output two-dimensional wavelet transform coefficients, and obtains a one-dimensional signal series. With scanned from transform coefficients included in low frequency band to that included in high frequency band, a one-dimensional signal series is generated, where the scanning pattern follows FIG. 2A in each frequency band and FIG. 2C between respective frequency bands. The VLC circuit 5 practices variable-length-coding to the one-dimensional signal series of the scanning circuit 4, corresponding to a preset variable length coding table. At this coding, when zero continues to the last transform coefficients, coding for a signal series is ended using a symbol indicating end of scanning. Corresponding to a preset variable length coding table, VLC circuit 6 performs variable-length-coding of supplementary information such as a motion vector given by the preprocessor circuit 1 or quantizing step size given by the quantizer circuit 3, etc. The multiplexing circuit 7 multiplexes a variable length code, transforms the result as an output of the coder; it is equipped with a transmission buffer. A rate control circuit 8 monitors code quantity transmitted to the multiplexing circuit 7, controls quantizing step size to the quantizer circuit 3, corresponding to state of the transmission buffer.

Next, an embodiment to adaptively select suitable scanning pattern corresponding to locality of a picture is explained.

Figure 8A:
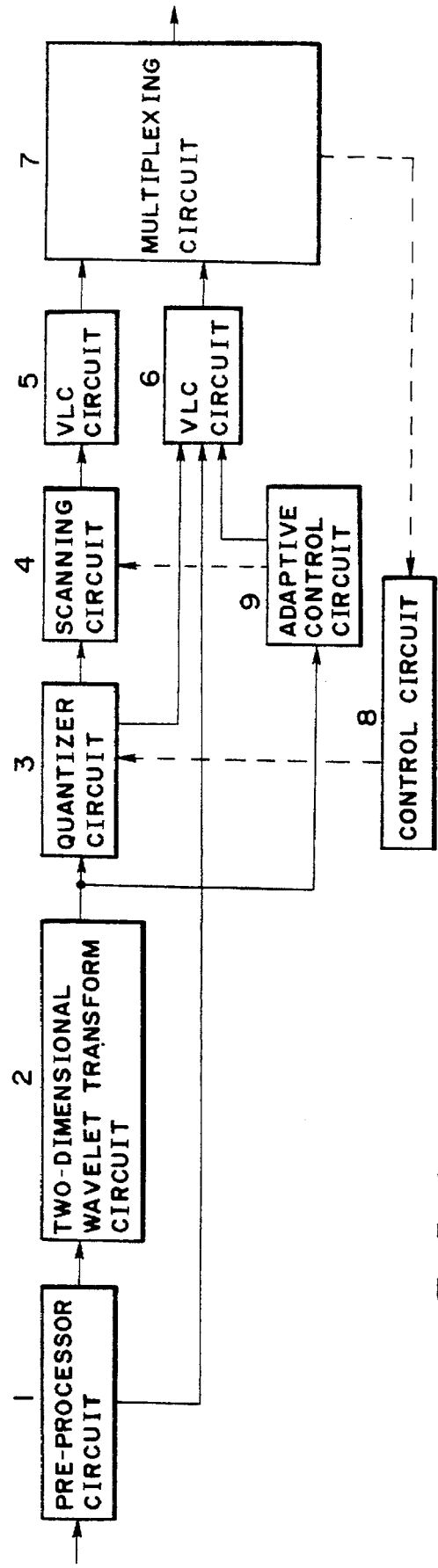
FIG. 8A and FIG. 8B show block diagrams when an adaptive scanning is introduced.
Figure 8B:
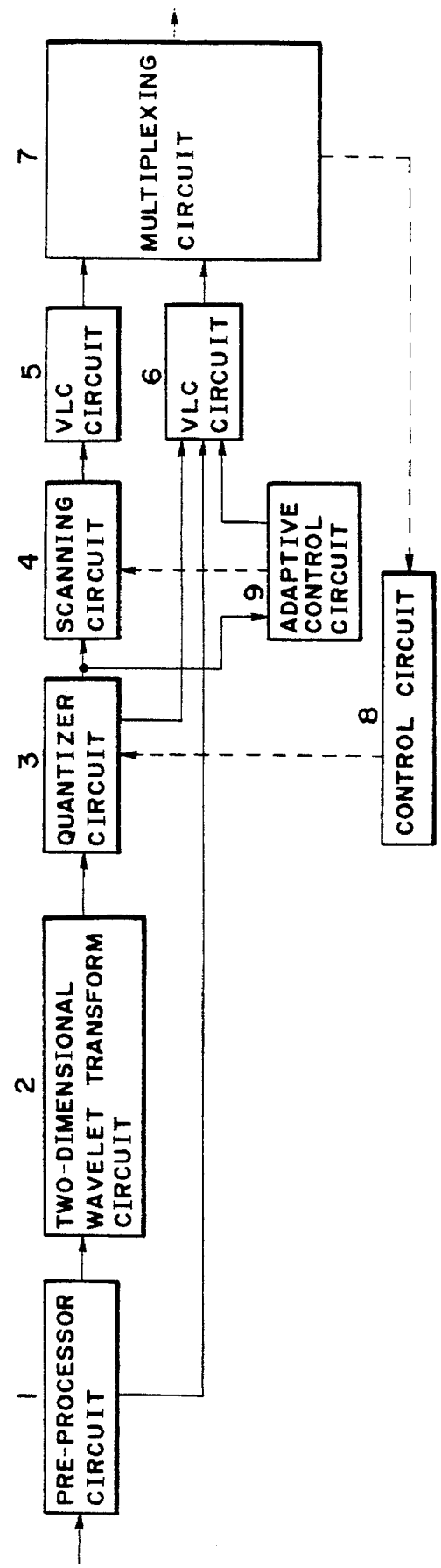
Figure 10:
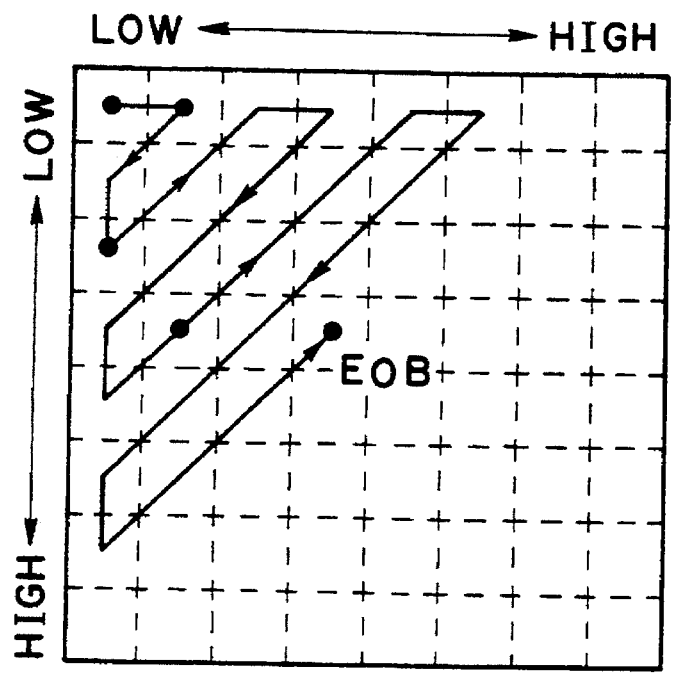
FIG. 10 shows a block diagram of an orthonormal transform scanning method.

FIG. 8A and FIG. 8B are block diagrams of coders to adaptively select suitable scanning pattern corresponding to locality of a picture. Here, an adaptive controller circuit 9 switches a scanning pattern of the scanning circuit 4 corresponding to locality of the picture. FIG. 8A bases adaptive control on energy distribution of wavelet transform coefficient before quantized and FIG. 8B bases adaptive control on significant transform coefficient distribution of wavelet transform coefficients after they are quantized, and they decide a scanning pattern of the scanning circuit 4 respectively.

When generating a one-dimensional signal series in the scanning circuit 4, the adaptive control circuit 9 can adaptively switch over the sequence of the frequency bands to be scanned corresponding to locality of the input signal. That is, corresponding to a bias of distribution of the transform coefficients, the scanning pattern shown in FIG. 2C normally, the scanning pattern shown in FIG. 2D for the transform coefficients concentrating energy in horizontal direction (F2, F5, F8), or the scanning pattern shown in FIG. 2E for the transform coefficients concentrating energy in vertical direction (F1, F4, F7), is selected for a scanning pattern respectively.

In addition, when generating a one-dimensional signal series in the scanning circuit 4, the adaptive control circuit 9 can adaptively switch over the scanning start point of each frequency band to be scanned corresponding to locality of the input signal. That is, the scanning pattern of the frequency bands F7, F8 and F9 corresponding to distribution of the internal transform coefficients of the frequency bands F4, F5 and F6.

The adaptive control circuit 9 is explained in greater detail below.

FIG. 9A is a block diagram of the adaptive control circuit 9 corresponding to FIG. 8A.

An energy calculation circuit 50 inputs each transform coefficient given by the two-dimension wavelet transform circuit 2, calculates a squared value thereof or an absolute value thereof, and outputs the result as energy of each transform coefficient. An accumulator 51 calculates sum of energy of each transform coefficient for each frequency band. A scanning pattern decision circuit 52 calculates sum of a squared value of each frequency band or an absolute value of each frequency band, and decides a scanning pattern between frequency bands so as to scan frequency bands in order of the average value from large to small. Then, it outputs a mode information to specify this scanning pattern to the scanning circuit 4 and the variable length coding circuit 6.

The accumulator 53 inputs energy of each transform coefficient from the energy calculation circuit 50, and calculates sum of energy of transform coefficients on each scanning line in each frequency band as shown in FIG. 2B. A scanning start point decision circuit 54 decides a scanning start point in each frequency band so as to scan the scanning line corresponding to the maximum sum by comparing sums of transform coefficients on each scanning line. Then, it outputs a mode information to specify this scanning start point to the scanning circuit 4 and the variable length coding circuit 6.

FIG. 9B is a block diagram of the adaptive control circuit 9 corresponding to FIG. 8B.

A significant transform coefficient counting circuit 55 counts the number of transform coefficients given by the quantizer circuit 3 for each frequency band and the number of significant transform coefficients, calculates a ratio that is the number of significant transform coefficients to the number of the transform coefficients for each frequency band. A scanning pattern decision circuit 56 compares the ratios, and decides a scanning pattern between frequency bands so as to scan frequency bands in order of the ratio from large to small. Then, it outputs a mode information to specify this scanning pattern to the scanning circuit 4 and the variable length coding circuit 6.

A pre-scan circuit 57 actually scans in each frequency band as shown in FIG. 2B and outputs the number of significant transform coefficients for each scanning line. A scanning start point decision circuit 58 compares the number of significant transform coefficients on each scanning line for each frequency band, and decides a scanning start point in each frequency band so as to scan from the scanning line of which number is large. Then, it outputs a mode information to specify this scanning start point to the scanning circuit 4 and the variable coding circuit 6.

It is to be noted that the above-mentioned adaptive control circuit 9 decides a scanning pattern, based on energy distribution of wavelet transform coefficients before quantized and significant transform coefficients distribution of wavelet transform coefficients after quantized. However, for example, if the scanning result of a in the frequency area F5 is zero run and that of b includes significant transform coefficients in FIG. 2B, based on this result it may be possible to change the scanning pattern of the scanning circuit 4 so as to start scanning from d in the frequency area F8, followed by scanning from c.

What is claimed is:

1. A wavelet transform coding method comprising:

two-dimensional wavelet transforming of an input picture signal, said transformation resulting in an output of a plurality of transform coefficients within a number of frequency subbands expressing a spatial area;

two-dimensionally arranging said transform coefficients;

quantizing said two-dimensionally arranged transform coefficients;

adaptively choosing a scanning pattern for each respective subband in accordance with the correlation between the respective transform coefficients found therein;

generating a one-dimensional signal series by scanning said transform coefficients after said transform coefficients are quantized according to said scanning pattern;

coding said one-dimensional signal series;

terminating said coding of said one-dimensional signal series by using a symbol indicating an end of said scanning when a zero order value continues to be scanned; and wherein said step of choosing said scanning pattern further comprises adaptively choosing a scanning start point when scanning said quantized transform coefficients in said each of said frequency subbands in accordance with a locality of said input picture signal.

2. The wavelet transform coding method of claim 1, wherein said step of choosing said scanning pattern further comprises:

a) horizontally scanning for said transform coefficients in a frequency band of which a horizontal portion belongs to a low-frequency band and a vertical portion belongs to a high-frequency band; and b) vertically scanning for said transform coefficients in a frequency band of which a horizontal portion belongs to a high-frequency band and a vertical portion belongs to a low-frequency band.

3. The wavelet transform coding method of claim 1, wherein said step of adaptively choosing said scanning start point further comprises:

scanning said transform coefficients in a predetermined frequency subband and deciding, based on this scanning result, a scanning start point in a number of following frequency subband.

4. The wavelet transform coding method of claim 1, wherein said step of adaptively choosing said scanning start point in said each of said frequency subbands in accordance with said locality of said input picture signal comprises:

choosing said scanning start point in each of said frequency subbands based on a significant transform coefficient distribution derived from said transform coefficients after these coefficients have been quantized in each of said frequency subbands.

5. The wavelet transform coding method of claim 4, wherein said step of adaptively choosing said scanning start point further comprises:

calculating a number of significant transform coefficients on each scanning line in each of said frequency subbands; and detecting a largest number from among said number of significant transform coefficients and choosing said scanning start point so that said scanning may be performed from a scanning line corresponding to said largest number.

6. The wavelet transform coding method of claim 1, wherein said step of adaptively choosing said scanning start point further comprises:

choosing said scanning start point in each of said frequency subbands based on an energy distribution of those of said transform coefficients that have not yet been quantized in each of said frequency subbands.

7. The wavelet transform coding method of claim 6, wherein said step of adaptively choosing said start points further comprises:

calculating a plurality of squared values of said transform coefficients on each of a number of scanning lines in each of said frequency subbands;

calculating a corresponding sum of said squared values of said transform coefficients on said each of said scanning lines; and detecting a largest sum from among said sums and deciding said scanning start point so as to start scanning from one of said scanning lines corresponding to said largest sum.

8. The wavelet transform coding method of claim 6, wherein said step of adaptively choosing said start points further comprises:

calculating a number of absolute values of said transform coefficients on each of said scanning lines in each of said frequency subbands;

calculating a corresponding sum of said absolute values of said transform coefficients on said each of said scanning lines; and detecting a largest sum from among said sums to allow for choosing said scanning start point such that said scanning may be performed from a scanning line corresponding to said largest sum.

9. The wavelet transform coding method of claim 1, wherein said step of adaptively choosing said scanning pattern comprises:

adaptively choosing a sequence of scanning for each of said frequency subbands in accordance with a locality of said input signal.

10. The wavelet transform coding method of claim 9, wherein said step of choosing said sequence of scanning is based on an energy distribution of said transform coefficients before said coefficients have yet been quantized in each of said frequency subbands.

11. The wavelet transform coding method of claim 10, wherein said step of choosing said sequence of scanning further comprises:

calculating squared values of said transform coefficients in each of said frequency subbands;

calculating an average value from said squared values of said transform coefficients in each of said frequency subbands; and choosing said scanning pattern such that the scanning in each of said frequency subbands is accomplished in an order of said average values, from the largest of said average values to the smallest of said average values.

12. The wavelet transform coding method of claim 10, wherein said step of choosing said sequence of scanning further comprises:

calculating absolute values of said transform coefficients in each of said frequency subbands;

calculating, from said absolute values of said transform coefficients, an average value for each of said frequency subbands; and choosing said scanning pattern such that scanning in each of said frequency subbands is accomplished in an order of said average values, from the largest of said average values to the smallest of said average values.

13. The wavelet transform coding method of claim 9, wherein said step of choosing said sequence of scanning further comprises:

choosing said sequence based on a distribution of significant transform coefficients after said transform coefficients have been quantized.

14. The wavelet transform coding method of claim 13, wherein said step of choosing said sequence of scanning further comprises:

calculating a number of transform coefficients in each of said frequency subbands;

calculating a number of significant transform coefficients in each of said frequency subbands;

calculating a unique ratio in each of said frequency subbands by dividing the number of transform coefficients thereof by the number of significant transform coefficients thereof; and deciding said scanning pattern such that scanning in each of said frequency subbands is based on an order of said ratios, from the largest of said ratios to the smallest of said ratios.

* * * * *